(12) United States Patent
Ito

(10) Patent No.: US 11,181,785 B2
(45) Date of Patent: Nov. 23, 2021

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/010,836

(22) Filed: Sep. 3, 2020

(65) Prior Publication Data

US 2021/0072581 A1 Mar. 11, 2021

(30) Foreign Application Priority Data

Sep. 6, 2019 (JP) .............................. JP2019-162932

(51) Int. Cl.
| | | |
|---|---|---|
| *G02F 1/1339* | (2006.01) | |
| *G02F 1/1335* | (2006.01) | |
| *G02F 1/1333* | (2006.01) | |
| *H04M 1/02* | (2006.01) | |
| *G03B 33/12* | (2006.01) | |

(Continued)

(52) U.S. Cl.
CPC .... *G02F 1/13394* (2013.01); *G02F 1/133345* (2013.01); *G02F 1/133512* (2013.01); *G02F 1/13398* (2021.01); *G02F 2201/123* (2013.01); *G03B 21/006* (2013.01); *G03B 33/12* (2013.01); *G06F 1/1616* (2013.01); *H04M 1/0202* (2013.01)

(58) Field of Classification Search
CPC ................ H04M 1/0202; G06F 1/1616; G02F 1/133345; G02F 1/133512; G02F 1/136209; G02F 2001/1351; G02F 1/1339; G02F 1/0107; G02F 2001/13396; G02F 1/13396; G02B 5/003; H01J 9/242; H01J 11/36; H01J 2211/36; H01J 2217/49271

See application file for complete search history.

(56) References Cited

U.S. PATENT DOCUMENTS 6,870,592 B1 3/2005 Yamamoto et al.
2010/0007811 A1* 1/2010 Choi ................. G02F 1/136209
349/43

(Continued)

FOREIGN PATENT DOCUMENTS

JP H11-212048 8/1999
JP 2001-005006 1/2001
(Continued)

*Primary Examiner* — Michael H Caley
*Assistant Examiner* — Mariam Qureshi
(74) *Attorney, Agent, or Firm* — JCIPRNET

(57) ABSTRACT

An electro-optical device includes a first substrate including a first pixel electrode and a second pixel electrode, a second substrate including a common electrode, and an electro-optical layer disposed between the first pixel electrode and the second pixel electrode, and the common electrode, the electro-optical layer having optical characteristics varying in accordance with an electric field, wherein the first substrate is provided with a spacer containing an inorganic material, the spacer defining a distance between the first substrate and the second substrate, and the spacer overlaps the first pixel electrode when viewed in a thickness direction of the first substrate.

5 Claims, 9 Drawing Sheets

(51) Int. Cl.
    *G06F 1/16*         (2006.01)
    *G03B 21/00*      (2006.01)

(56) References Cited

U.S. PATENT DOCUMENTS

| | | | | |
|---|---|---|---|---|
| 2014/0078423 | A1* | 3/2014 | Suzuki | G02F 1/1339 |
| | | | | 349/12 |
| 2017/0010496 | A1* | 1/2017 | Shim | G02F 1/133512 |
| 2017/0102574 | A1* | 4/2017 | Kim | G02F 1/133512 |
| 2017/0115525 | A1* | 4/2017 | Okita | G02F 1/133512 |
| 2017/0317105 | A1* | 11/2017 | Kim | G02F 1/13439 |
| 2019/0094633 | A1* | 3/2019 | Song | H01L 27/3276 |
| 2019/0331953 | A1* | 10/2019 | Park | G02F 1/13394 |
| 2020/0387028 | A1* | 12/2020 | Daishi | G02F 1/136286 |

FOREIGN PATENT DOCUMENTS

| | | |
|---|---|---|
| JP | 2003-084290 | 3/2003 |
| JP | 2006-301476 | 11/2006 |

* cited by examiner

ELECTRO-OPTICAL DEVICE AND ELECTRONIC APPARATUS

The present application is based on, and claims priority from JP Application Serial Number 2019-162932, filed Sep. 6, 2019, the disclosure of which is hereby incorporated by reference herein in its entirety.

BACKGROUND

1. Technical Field

The present disclosure relates to an electro-optical device and an electronic apparatus.

2. Related Art

There is a known electro-optical device such as a liquid crystal device, which is used as a light valve of a projector, for example. The liquid crystal device described in JP 2003-84290 A includes a substrate including pixel electrodes, a substrate including a counter electrode, and a liquid crystal layer disposed between these two substrates.

In the liquid crystal device described in JP 2003-84290 A, resin-made spacers are arranged in the liquid crystal layer in order to achieve uniform distances between the two substrates. However, the arrangement of the resin-made spacers in the liquid crystal layer may cause a resin constituent to enter into the liquid crystal layer, to cause the occurrence of failure such as an erroneous operation in the liquid crystal device.

In the liquid crystal device described in JP 2006-301476 A, in order to prevent the erroneous operation due to the entry of organic materials, spacers containing an inorganic material are used. The spacers are arranged to avoid overlapping the pixel electrodes in a pixel region.

Unfortunately, with the arrangement relationship between the spacers and the pixel electrodes described in JP 2006-301476 A, an issue arises in that a wiring area becomes large due to the inclusion of the spacers, preventing pixels from achieving high density.

SUMMARY

An aspect of the electro-optical device of the present disclosure includes a first substrate including a first pixel electrode and a second pixel electrode, a second substrate including a common electrode, and an electro-optical layer disposed between the first pixel electrode and the second pixel electrode, and the common electrode, the electro-optical layer having optical characteristics varying in accordance with an electric field, wherein the first substrate is provided with a spacer containing an inorganic material, the spacer defining a distance between the first substrate and the second substrate, and the spacer overlaps the first pixel electrode when viewed in a thickness direction of the first substrate.

DESCRIPTION OF EXEMPLARY EMBODIMENTS

Figure 1:
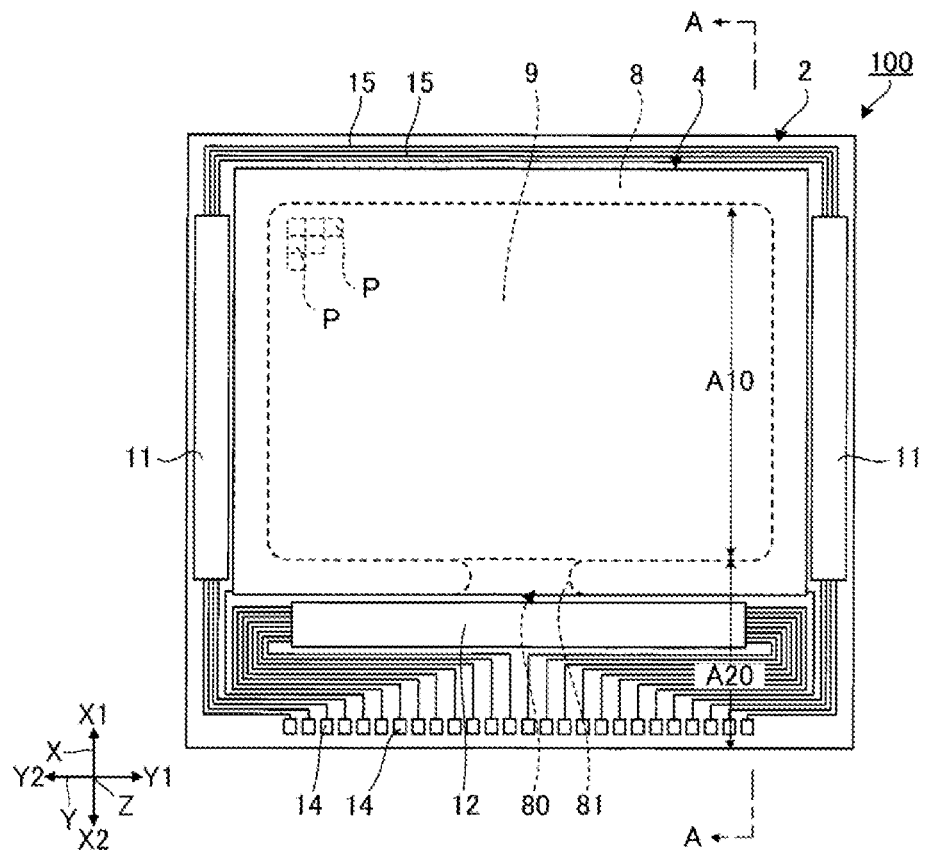
FIG. 1 is a plan view of an electro-optical device according to a preferred embodiment.

Preferred embodiments of the present disclosure will be described below with reference to the appended drawings. Note that, in the drawings, dimensions and scales of sections are differed as appropriate from actual dimensions and scales, and some of the sections are schematically illustrated to make them easily recognizable. In addition, the scope of the present disclosure is not limited to these embodiments unless otherwise stated to limit the present disclosure in the following description.

1. Electro-Optical Apparatus

As an example of the electro-optical device of the present disclosure, a liquid crystal device of an active matrix scheme is described as the example.

1A. Basic Configuration

Figure 2:
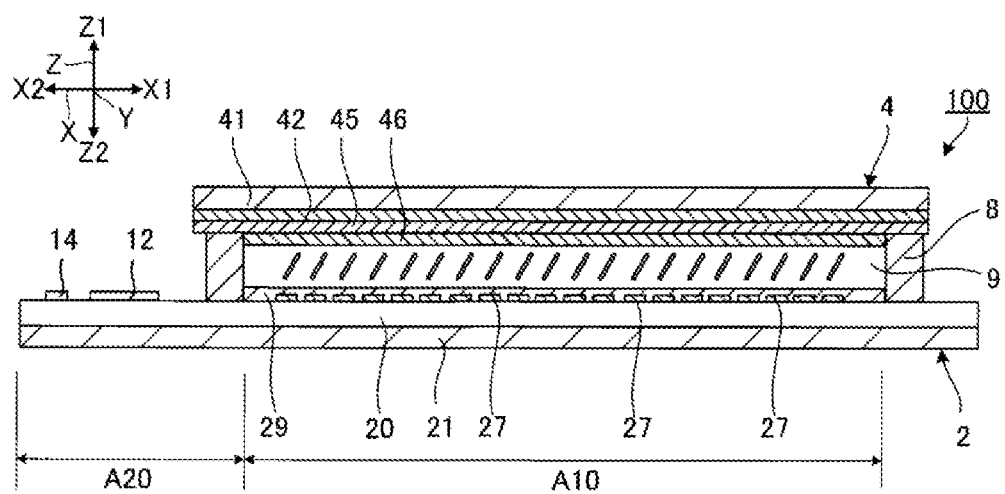
FIG. 2 is a cross-sectional view taken along a line A-A in FIG. 1.

FIG. 1 is a plan view of an electro-optical device 100 according to the embodiment. FIG. 2 is a cross-sectional view taken along a line A-A in FIG. 1. Note that, for convenience of explanation, the description will be made below appropriately using an X axis, a Y axis, and a Z axis that are orthogonal to one another. In addition, a direction along the X axis is referred to as "X1 direction", and a direction opposite to the X1 direction is referred to as "X2 direction". Similarly, a direction along the Y axis is referred to as "Y1 direction", and a direction opposite to the Y1 direction is referred to as "Y2 direction". A direction along the Z axis is referred to as "Z1 direction", and a direction opposite to the Z1 direction is referred to as "Z2 direction".

The electro-optical device 100 illustrated in FIGS. 1 and 2 serves as a transmissive-type liquid crystal display apparatus. As illustrated in FIG. 2, the electro-optical device 100 includes an element substrate 2 having translucency, a counter substrate 4 having translucency, a sealing member 8 having a frame shape, and a liquid crystal layer 9. The element substrate 2 exemplifies "first substrate". The counter substrate 4 exemplifies "second substrate". The liquid crystal layer 9 exemplifies "electro-optical layer". The sealing member 8 is disposed between the element substrate 2 and the counter substrate 4. The liquid crystal layer 9 is disposed in a region surrounded by the element substrate 2, the counter substrate 4, and the sealing member 8. The element substrate 2, the liquid crystal layer 9, and the counter substrate 4 are aligned along the Z axis. A surface of a second base body 41 described below, included in the counter substrate 4 is parallel to an X-Y plane. In the following, viewing from the Z1 direction or the Z2 direction, which coincides with a thickness direction of the element substrate 2, is referred to as "plan view".

In the electro-optical device 100 of the embodiment, light is incident on the counter substrate 4, for example, and passes through the liquid crystal layer 9 to be emitted from the element substrate 2. Note that the light may be incident on the element substrate 2 and passes through the liquid crystal layer 9 to be emitted from the counter substrate 4. The light serves as visible light. The term "translucency" refers to a transparency to the visible light, and it is preferred that the term represent a transmittance of the visible light being not less than 50%. In addition, as illustrated in FIG. 1, the electro-optical device 100 is formed in a quadrilateral shape in a plan view, however, the shape in a plan view of the electro-optical device 100 may be, for example, a round shape and the like, without being limited to the quadrilateral shape.

As illustrated in FIG. 2, the element substrate 2 includes a first base body 21, a wiring layer 20, a plurality of pixel electrodes 27, a first alignment film 29, and the like. The first base body 21 is constituted by a plate having translucency and insulating properties. The wiring layer 20 is disposed between the first base body 21 and the plurality of pixel electrodes 27. The pixel electrode 27 has translucency, and is composed of a transparent conductive material such as Indium Tin Oxide (ITO) or Indium Zinc Oxide (IZO), for example. The first alignment film 29 is located closest to a side of the liquid crystal layer 9 in the element substrate 2, and causes liquid crystal molecules of the liquid crystal layer 9 to be aligned. Examples of a constituent material of the first alignment film 29 include polyimide and silicon oxide, for example. Note that a configuration of the element substrate 2 will be described later.

As illustrated in FIG. 2, the counter substrate 4 includes the second base body 41, an insulating film 42, a common electrode 45, and a second alignment film 46. The second base body 41, the insulating film 42, the common electrode 45, and the second alignment film 46 are arranged in this order. The second alignment film 46 is located closest to the side of the liquid crystal layer 9. The second base body 41 is composed of a plate having translucency and insulating properties. The second base body 41 is composed of a glass, a quartz, or the like, for example. The insulating film 42 is formed of a silicon-based inorganic material having translucency and insulating properties, such as silicon oxide, for example. The common electrode 45 is composed of the transparent conductive material such as ITO or IZO, for example. The second alignment film 46 causes the liquid crystal molecules of the liquid crystal layer 9 to be aligned. Examples of a constituent material of the second alignment film 46 include polyimide and silicon oxide, for example.

The sealing member 8 is formed using an adhesive containing various types of curable resins such as epoxy resin, for example. The sealing member 8 is firmly affixed to each of the element substrate 2 and the counter substrate 4. At a part in a peripheral direction of the sealing member 8, an injection port 81 for injecting a liquid crystal material containing liquid crystal molecules into an inside of the sealing member 8 is formed. The injection port 81 is sealed with a sealing material 80 formed using various types of resin materials.

The liquid crystal layer 9 contains liquid crystal molecules having positive or negative dielectric anisotropy. The liquid crystal layer 9 is interposed between the element substrate 2 and the counter substrate 4 such that the liquid crystal molecules are in contact with both the first alignment film 29 and the second alignment film 46. The liquid crystal layer 9, which is disposed between the plurality of pixel electrodes 27 and the common electrode 45, has optical characteristics varying depending on an electric field. Specifically, the liquid crystal molecules included in the liquid crystal layer 9 vary in alignment depending on a voltage applied to the liquid crystal layer 9. That is, the liquid crystal layer 9 enables gray scale display by modulating light in accordance with the voltage applied.

As illustrated in FIG. 1, a plurality of scanning line driving circuits 11, a data line driving circuit 12, and a plurality of external terminals 14 are arranged at a face on a side of the counter substrate 4 of the element substrate 2. The external terminal 14 is coupled with a drawn-out wiring 15 drawn out from each of the scanning line driving circuit 11 and the data line driving circuit 12.

The electro-optical device 100 includes a displaying region A10 for displaying images, and a peripheral region A20 surrounding the displaying region A10 in a plan view. The displaying region A10 is provided with a plurality of pixels P arrayed in a matrix pattern. One piece of the pixel electrode 27 is disposed for one piece of the pixel P. In the peripheral region A20, the scanning line driving circuit 11, the data line driving circuit 12, and the like are arranged.

1B. Electrical Configuration

Figure 3:
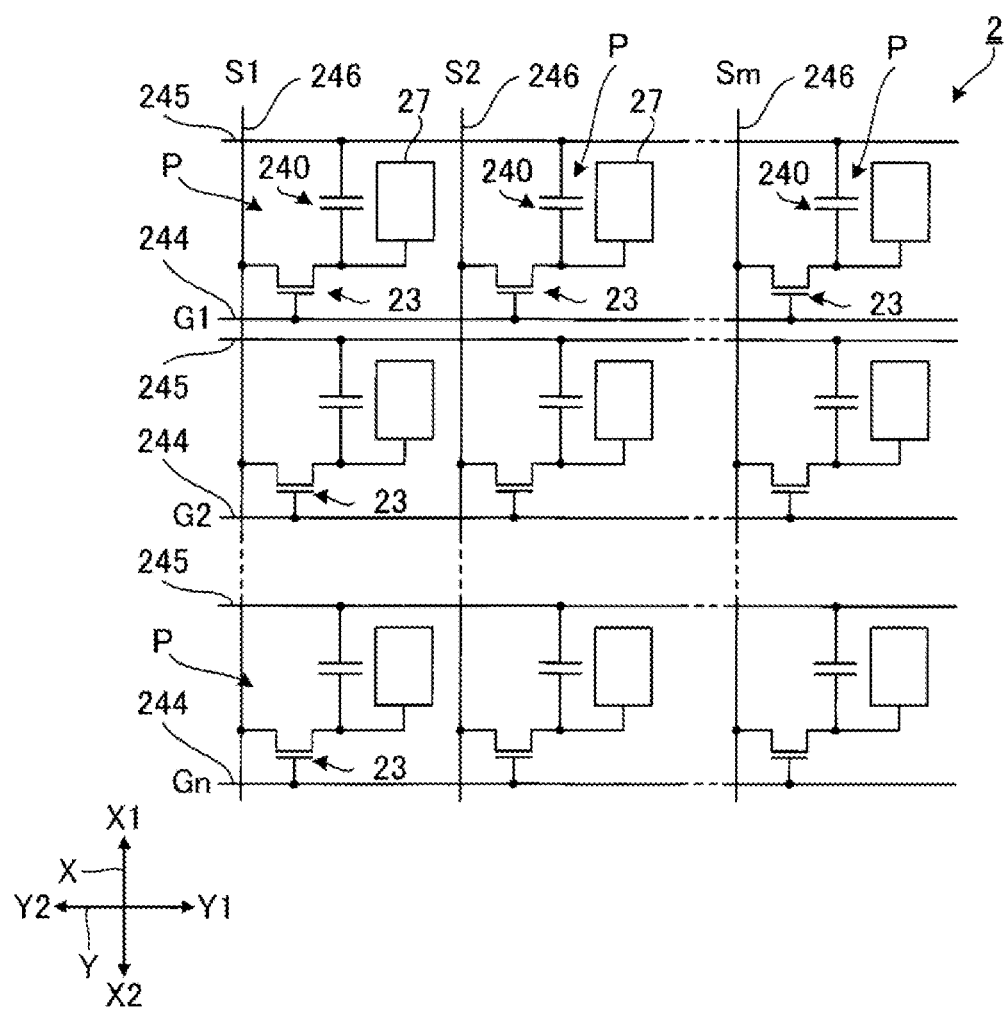
FIG. 3 is an equivalent circuit diagram illustrating an electrical configuration of an element substrate.

FIG. 3 is an equivalent circuit diagram illustrating an electrical configuration of the element substrate 2. As illustrated in FIG. 3, the element substrate 2 is provided with n pieces of scanning lines 244, m pieces of data lines 246, and n pieces of capacitor lines 245. The n and m are each an integer of 2 or greater.

The n pieces of scanning lines 244 each extend along the Y axis and are aligned at equal intervals along the X axis. The scanning line 244 is electrically coupled to a gate of a transistor 23. The n pieces of scanning lines 244 are also electrically coupled to the scanning line driving circuit 11 illustrated in FIG. 1. To the n pieces of scanning lines 244, scanning signals G1, G2, . . . , and Gn are line-sequentially supplied from the scanning line driving circuit 11.

The m pieces of data lines 246 illustrated in FIG. 3 each extend along the X axis and are aligned at equal intervals along the Y axis. The data lines 246 is electrically coupled to a source of the transistor 23. The m pieces of data lines 246 are also electrically coupled to the data line driving circuit 12 illustrated in FIG. 1. To the m pieces of data lines 246, image signals S1, S2, . . . , and Sm are line-sequentially supplied from the data line driving circuit 12.

The n pieces of scanning lines 244 and the m pieces of data lines 246 are insulated from each other and are formed in a lattice-like pattern in a plan view. A region surrounded by two pieces of scanning lines 244 adjacent to each other and two pieces of data lines 246 adjacent to each other corresponds to the pixel P. The one piece of the pixel P is provided with the one piece of the pixel electrode 27. The one piece of the pixel electrode 27 is electrically coupled to one piece of the transistor 23. The transistor 23 serves as a TFT that functions as a switching element, for example.

The n pieces of capacitor lines 245 each extend along the Y axis and are aligned at equal intervals along the X axis.

Further, the n pieces of capacitor lines 245 are insulated from both the plurality of the data lines 246 and the plurality of the scanning lines 244, and are formed spaced apart from these lines. A fixed potential such as a ground potential is applied to the capacitor line 245, for example. In addition, a storage capacitor 240 is provided in parallel to a liquid crystal capacitor, between the capacitor line 245 and the pixel electrode 27, to prevent leakage of charge held at the liquid crystal capacitor. The storage capacitor 240 serves as a capacitor element for retaining a potential of the pixel electrode 27 in accordance with the image signal Sm that is supplied.

The scanning signals G1, G2, . . . , and Gn become sequentially active and the n pieces of scanning lines 244 are sequentially selected, then the transistor 23 coupled to the scanning line 244 that is selected is turned to ON-state. Then, the image signals S1, S2, . . . , and Sm having magnitudes commensurate with a grayscale to be displayed are received by the pixel P corresponding to the scanning line 244 that is selected, and are then applied to the pixel electrode 27. This allows a voltage in accordance with the grayscale to be displayed to be applied to the liquid crystal capacitor formed between the pixel electrode 27 and the common electrode 45 of the counter substrate 4 illustrated in FIG. 2, where the alignment of the liquid crystal molecules varies depending on the voltage applied. In addition, the voltage applied is held by the storage capacitor 240. Such a variation in the alignment of the liquid crystal molecules causes light to be modulated, enabling grayscale display.

1C. Configuration of Element Substrate 2

Figure 4:
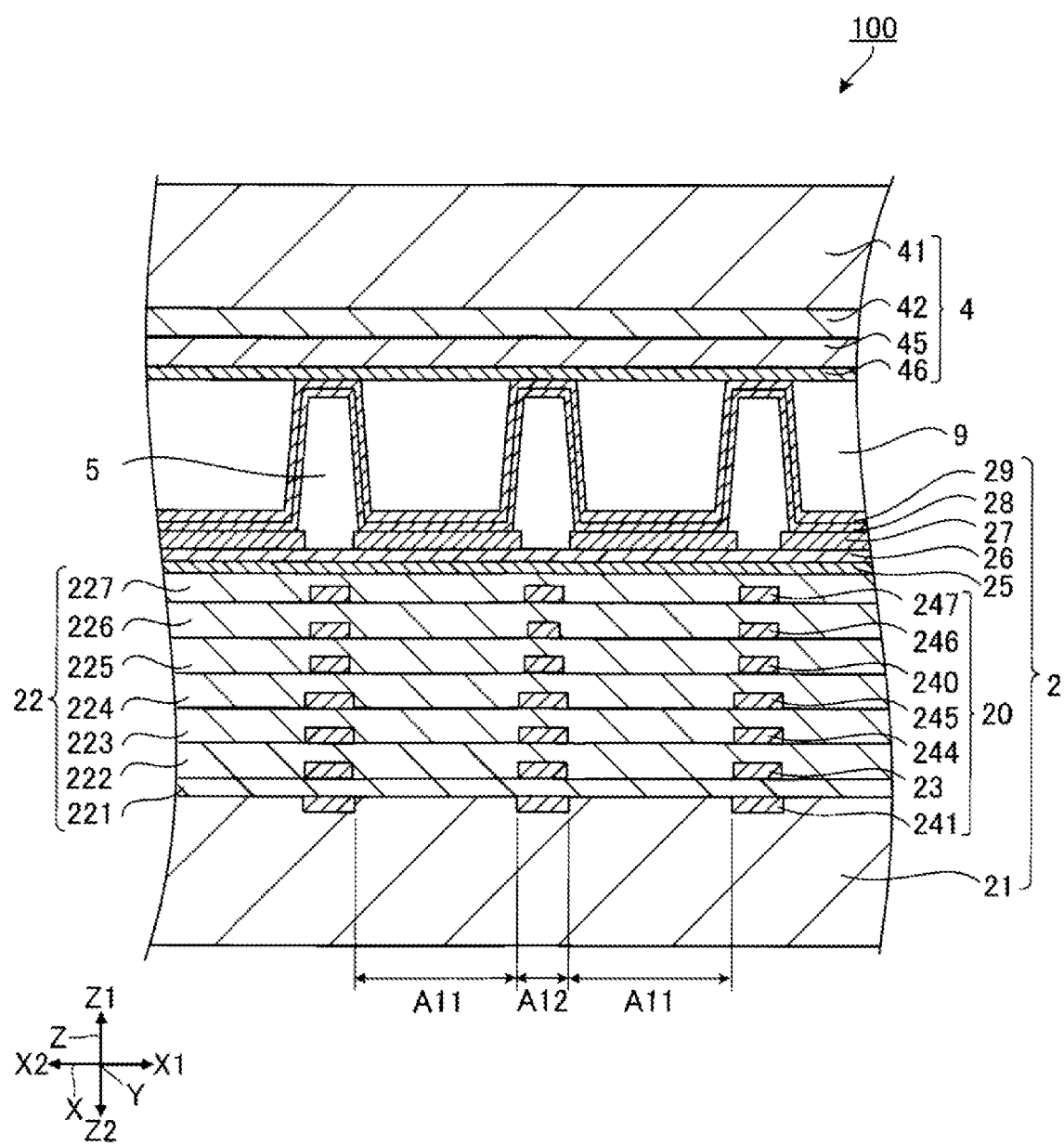
FIG. 4 is a cross-sectional view illustrating a part of an element substrate.

FIG. 4 is a cross-sectional view illustrating a part of the element substrate 2. In the following description, a description will be given such that the Z1 direction is directed to upside and the Z2 direction is directed to lowerside. As illustrated in FIG. 4, the element substrate 2 includes the first base body 21, a light-shielding body 241, the wiring layer 20, a protective layer 25, a metal oxide layer 26, the plurality of pixel electrodes 27, a plurality of spacers 5, a coating layer 28, and the first alignment film 29. Note that the protective layer 25 may be regarded as a layer included in the wiring layer 20.

As illustrated in FIG. 4, the first base body 21 is provided with the light-shielding body 241 having light-shielding properties and electrical conductivity. The light-shielding body 241 is provided for each of the transistors 23. Note that the light-shielding body 241 is disposed inside a concave portion provided at the first base body 21. Examples of a constituent material of the light-shielding body 241 include metal, metal nitride, and metal silicide such as tungsten (W), titanium (Ti), chromium (Cr), iron (Fe), and aluminum (Al), for example. A use of the tungsten among these materials enables the light-shielding body 241 to particularly effectively prevent light from being incident on the transistor 23. The light-shielding body 241 may also be electrically coupled to a gate electrode included in the transistor 23, and may be used as a back gate.

The wiring layer 20 is disposed on the light-shielding body 241. The wiring layer 20 includes the transistors 23, the scanning lines 244, the capacitor lines 245, the storage capacitors 240, the data lines 246, and coupling wirings 247. The wiring layer 20 also includes an insulating body 22 having insulating properties and translucency. The insulating body 22 has a configuration in which interlayer insulating films 221, 222, 223, 224, 225, 226, and 227 are layered in this order. The interlayer insulating films 221 to 227 are each composed of a silicon oxide film formed by thermal oxidation or chemical vapor deposition (CVD) method, for example. A plurality of the transistors 23 and various types of wirings are each arranged as appropriate between the respective layers of the insulating body 22.

The interlayer insulating film 221 is disposed at the first base body 21. The transistor 23 is disposed between the interlayer insulating film 221 and the interlayer insulating film 222. Although not illustrated in detail, the transistor 23 includes a semiconductor layer, a gate electrode, and a gate insulating film. The semiconductor layer has a source region, a drain region, and a channel region. The scanning line 244 is disposed between the interlayer insulating film 222 and the interlayer insulating film 223. The scanning line 244 is electrically coupled to a gate electrode of the transistor 23. The capacitor line 245 is disposed between the interlayer insulating film 223 and the interlayer insulating film 224. The storage capacitor 240 is disposed between the interlayer insulating film 224 and the interlayer insulating film 225. The storage capacitor 240 includes an electrode electrically coupled to, for example, a drain region of the transistor 23, an electrode electrically coupled to the capacitor line 245, and a dielectric layer disposed between these two electrodes. The data line 246 is disposed between the interlayer insulating film 225 and the interlayer insulating film 226. The data line 246 is electrically coupled to a source region of the transistor 23. The coupling wiring 247 is disposed between the interlayer insulating film 226 and the interlayer insulating film 227. The coupling wiring 247 serves as "conductive film" coupled to the pixel electrode 27, and electrically couples an electrode of the storage capacitor 240 and the pixel electrode 27. One piece of the coupling wiring 247 is provided corresponding to the one piece of the pixel electrode 27.

Note that in FIG. 4, the transistor 23 and the various types of wirings disposed between the respective layers of the insulating body 22 are schematically illustrated. The various types of wirings can be arbitrarily arranged without being limited to the example illustrated in FIG. 4 For example, the storage capacitor 240 may be disposed at an upper layer from the data line 246. In addition, the coupling wiring 247 may be omitted, and the pixel electrode 27 may be directly coupled to an electrode included in the storage capacitor 240. In this case, the electrode included in the storage capacitor 240 corresponds to "conductive film" that is coupled to the pixel electrode 27.

Each of the electrodes included in the storage capacitor 240 is constituted by a titanium nitride film, for example. The various types of wirings such as the scanning line 244, the capacitor line 245, the data line 246, and the coupling wiring 247 are constituted by a layered body of aluminum films and titanium nitride films, for example. The inclusion of the aluminum film makes it possible to reduce the resistance compared to a case where the various wrings are constituted by only the titanium nitride film. Note that each of these electrodes or various types of wirings may be composed of materials other than the above-described materials. For example, each of these electrodes or wirings may be composed of a metal, a metal nitride, and a metal silicide such as tungsten, titanium, chromium, iron, and aluminum, for example.

Figure 5:
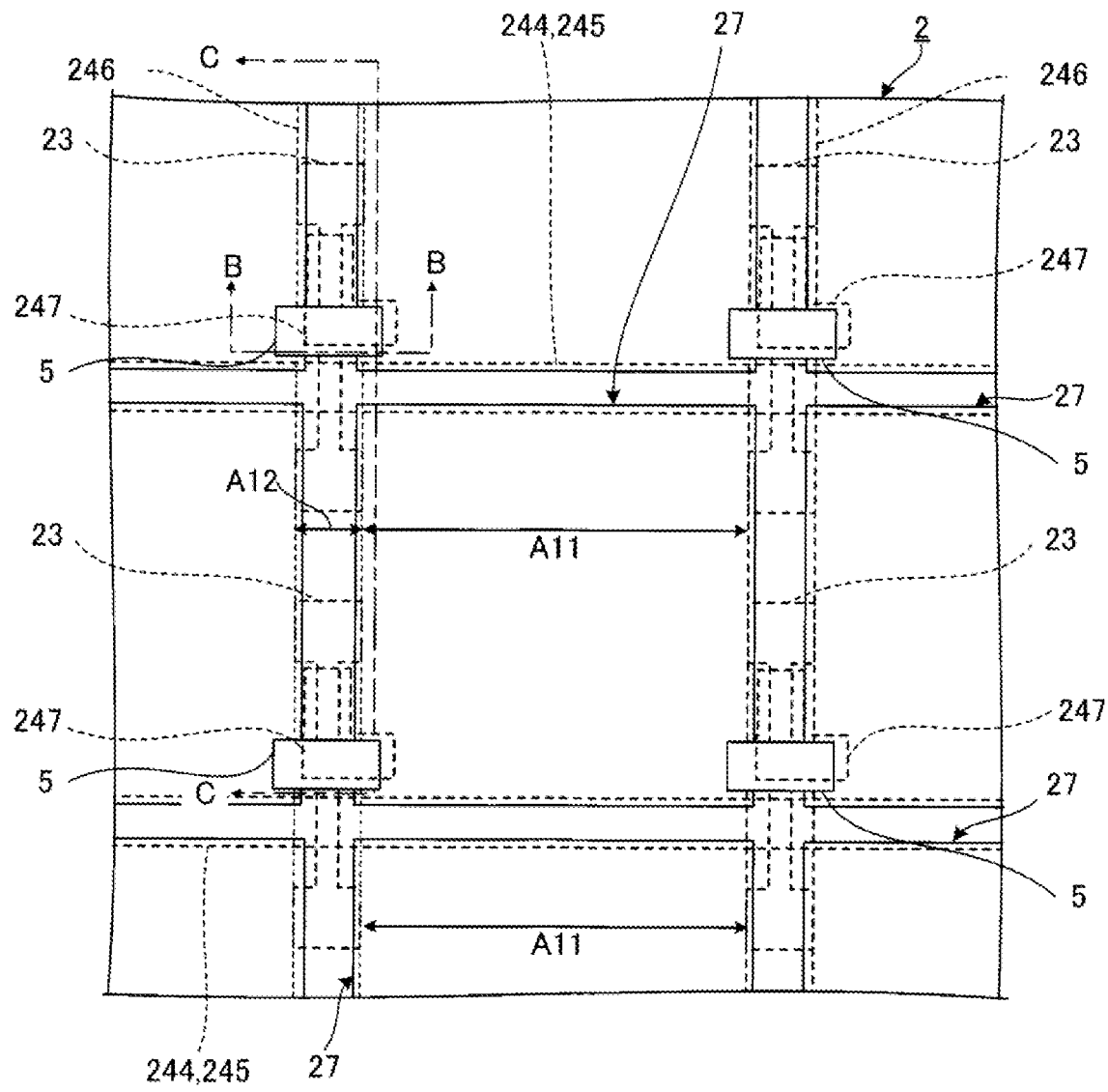
FIG. 5 is a plan view illustrating a part of an element substrate.

FIG. 5 is a plan view illustrating a part of the element substrate 2. As illustrated in FIG. 5, the element substrate 2 includes a plurality of light-transmitting regions A11 through which light passes and a wiring region A12 for blocking light. The plurality of light-transmitting regions A11 are arrayed in a matrix pattern and are each formed in a substantially quadrilateral shape when viewed in the Z1 direction. The pixel electrode 27 is provided in each of the light-transmitting regions A11. The wiring region A12 is formed in a lattice-like pattern when viewed in the Z1 direction, and surrounds the light-transmitting regions A11. The wiring region A12 is provided with the transistors 23, the scanning lines 244, the data lines 246, the capacitor lines 245, and the coupling wirings 247. The plurality of the scanning lines 244 and the plurality of the data lines 246 are formed in a lattice-like pattern when viewed in the Z1 direction. The transistor 23 is disposed at an intersection position between the scanning line 244 and the data line 246. Note that, although not illustrated in FIG. 5, the storage capacitor 240 is also disposed at the intersection position.

1D. Configuration of Spacer 5 and Vicinity of Spacer 5

Figure 6:
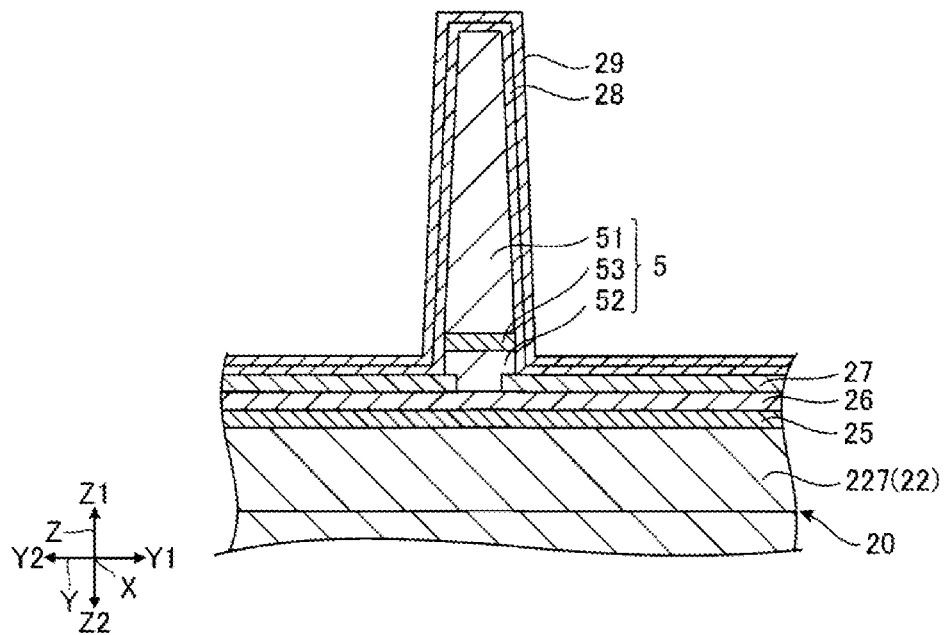
FIG. 6 is a cross-sectional view illustrating a spacer and a vicinity of the spacer.
Figure 7:
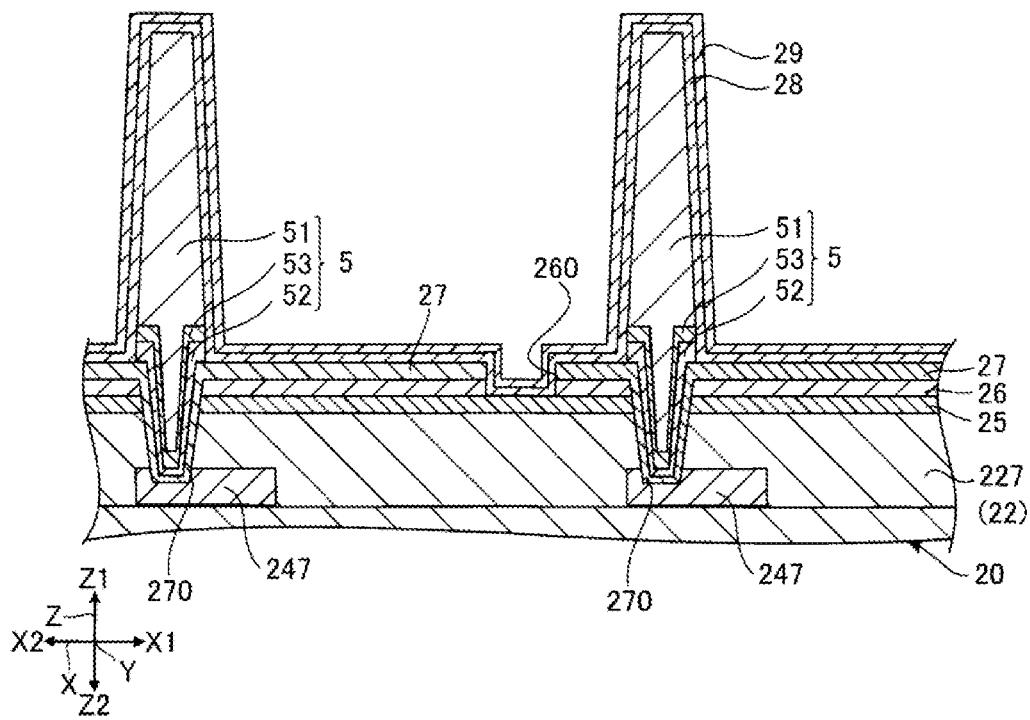
FIG. 7 is a cross-sectional view illustrating a spacer and a vicinity of the spacer.

FIGS. 6 and 7 are cross-sectional views each illustrating the spacer 5 and a vicinity of the spacer 5. FIG. 6 corresponds to a cross section taken along line B-B in FIG. 5, and FIG. 7 corresponds to a cross section taken along line C-C in FIG. 5. As illustrated in FIGS. 6 and 7, the protective layer 25 is disposed on the wiring layer 20. The protective layer 25 has hygroscopic properties and adsorbs moisture entrained in the liquid crystal layer 9. The protective layer 25 is composed of an inorganic material having translucency and hygroscopic properties, such as Borosilicate Glass (BSG), for example. Note that the protective layer 25 may be omitted as appropriate.

The metal oxide layer 26 is disposed on the protective layer 25. The metal oxide layer 26 is disposed between the insulating body 22 and the pixel electrode 27, and makes contact with both the protective layer 25 and the pixel electrode 27. The metal oxide layer 26 contains an aluminum oxide ($Al_2O_3$) or a hafnium oxide ($HfO_2$). The provision of such a metal oxide layer 26 makes it possible to suppress a damage to the protective layer 25 and the insulating body 22 during processing of the pixel electrode 27.

In addition, the metal oxide layer 26, which contains the aluminum oxide, makes it possible to reduce an interfacial reflection occurring between the insulating body 22 and the pixel electrode 27. Specifically, when the insulating body 22 is composed of a silicon oxide and the pixel electrode 27 is composed of an ITO as described above, a refractive index at the metal oxide layer 26 is higher than the refractive index at the insulating body 22 and is lower than the refractive index at the pixel electrode 27. That is, the refractive indices at the insulating body 22, the metal oxide layer 26, and the pixel electrode 27 are higher in this order. This makes it possible to suppress the interfacial reflection occurring between the insulating body 22 and the pixel electrode 27 compared to a case where the metal oxide layer 26 is not provided. This makes it possible to suppress a reduction of a light utilization efficiency. Note that in the embodiment, the protective layer 25 is provided on the insulating body 22, and the refractive indices at the protective layer 25, the metal oxide layer 26, and the pixel electrode 27 are higher in this order as well.

As illustrated in FIG. 7, a light-shielding layer 53 includes an opening portion 260 that opens between two pieces of the pixel electrodes 27 adjacent to each other. The inclusion of the opening portion 260 allows the protective layer 25 to include a portion that avoids overlapping the light-shielding layer 53 when viewed in the Z1 direction. This makes it possible to effectively cause the protective layer 25 to exhibit the hygroscopic properties. Note that the protective layer 25 can exhibit the hygroscopic properties even when the coating layer 28 and the first alignment film 29 are arranged on the protective layer 25. However, the coating layer 28 and the first alignment film 29 may not be provided on the protective layer 25.

The plurality of pixel electrodes 27 are arranged on the metal oxide layer 26. The pixel electrode 27 includes a contact portion 270 formed along a wall face of a contact hole provided through the interlayer insulating film 227. The contact portion 270 is coupled to the coupling wiring 247. Note that the pixel electrode 27 may be coupled to the coupling wiring 247 by a metal plug provided to fill the contact hole.

The spacer 5 in a columnar shape is disposed on the pixel electrode 27. The spacer 5 is disposed to fill a part of the contact hole provided through the interlayer insulating film 227. The spacer 5 defines a distance between the element substrate 2 and the counter substrate 4. Specifically, as illustrated in FIG. 4, the spacer 5 defines a distance between the pixel electrode 27 and the common electrode 45. In other words, the spacer 5 defines a thickness of the liquid crystal layer 9. The spacer 5 protrudes, along the Z1 direction, from the pixel electrode 27 toward the counter substrate 4. The spacer 5 appears trapezoidal in cross-section when cut in a plane including the Z axis. The spacer 5 protrudes from the pixel electrode 27 at a portion gradually narrowing in width toward a tip end face. The spacer 5 is coupled, at the tip end face, to the counter substrate 4 via the coating layer 28 and the first alignment film 29. Note that the spacer 5 may directly make contact with the counter substrate 4 at the tip end face.

The spacer 5 is composed of an inorganic material. That is, the spacer 5 is devoid of a resin material. This makes it possible to prevent the occurrence of failure such as an erroneous operation due to organic contamination caused by an entry of a resin constituent into the liquid crystal layer 9. In addition, the spacer 5, by being composed of the inorganic material, makes it possible to enhance a dimensional accuracy of the spacer 5 and to prevent the occurrence of dimensional change in the spacer 5 over time, compared to a case where the spacer 5 is composed of an organic material. This makes it possible to stabilize the distance between the element substrate 2 and the counter substrate 4 over a long period of time. This also makes it possible to reduce a difference in the distance for each of the pixels P over a long period of time. Note that it suffices that the spacer 5 contain the inorganic material, and the spacer 5 may not be constituted by the inorganic material in its entirety. In this case, the spacer 5, by being composed of the inorganic material at the outer surface at least, makes it possible to suppress the occurrence of failure such as the erroneous operation due to organic contamination.

As illustrated in FIG. 5, the spacer 5 overlaps the pixel electrode 27 when viewed in the Z1 direction. In other words, the spacer 5 can be located overlapped with the pixel electrode 27 when viewed in the Z1 direction. This makes it possible to increase a degree of freedom in installing the spacer 5. Further, an abbreviation of an additional region for providing the spacer 5 allows the pixels P to achieve higher density than a case where the spacer 5 avoids overlapping the pixel electrode 27 when viewed in the Z1 direction. This makes it possible to enhance the resolution of the electro-optical device 100.

In addition, the provision of the spacer 5 at the element substrate 2 in place of at the counter substrate 4 makes it possible to enhance a positional accuracy of the spacer 5 with respect to the pixel electrode 27. This makes it possible to suppress the spacer 5 from reducing an opening ratio.

As illustrated in FIG. 5, the spacer 5 overlaps the plurality of pixel electrodes 27 adjacent to each other when viewed in the Z1 direction. In the illustrated example, the spacer 5 overlaps the two pieces of the pixel electrodes 27 when viewed in the Z1 direction. In other words, it can be regarded that the plurality of pixel electrodes 27 correspond to one piece of the spacer 5. The one piece of the spacer 5 overlapping the plurality of pixel electrodes 27 when viewed in the Z1 direction enables the pixels P to achieve higher density than a case where the one piece of the spacer 5 overlaps only the one piece of the pixel electrode 27 when viewed in the Z1 direction. Here, the "two pieces of the pixel electrodes 27 adjacent to each other" refers to any two pieces of the pixel electrodes 27 adjacent to each other along any one of the X axis, the Y axis, and an axis intersecting both the X axis and the Y axis in the X-Y plane. Provided that the one piece of the pixel electrode 27 of any one of the plurality of pixel electrodes 27 is "first pixel electrode", and another one piece of the pixel electrode 27 adjacent to the one piece of the pixel electrode 27 is "second pixel electrode", the spacer 5 is provided between the "first pixel electrode" and the "second pixel electrode". In the illustrated example, the spacer 5 overlaps the two pieces of the pixel electrodes 27 adjacent to each other on the Y axis when viewed in the Z1 direction. Note that the spacer 5 also overlaps a wiring region A12 when viewed in the Z1 direction.

Further, the spacer 5 illustrated in FIG. 5 has a quadrilateral shape when viewed in the Z1 direction, and may also have, for example, a circular shape or the like when viewed in the Z1 direction without being limited to having a quadrilateral shape. In addition, the spacer 5 illustrated in FIG. 5 viewed in the Z1 direction is quadrangular in shape with a longitudinal shape in a direction along the Y axis, and may also be quadrangular in shape with a longitudinal shape in a direction along the X axis, for example.

As illustrated in FIGS. 6 and 7, the spacer 5 is constituted by a plurality of layers. Specifically, the spacer 5 includes a second insulating layer 52, the light-shielding layer 53, and a first insulating layer 51. The second insulating layer 52, the light-shielding layer 53, and the first insulating layer 51 are layered above the pixel electrode 27 in this order along the Z1 direction.

The second insulating layer 52 is disposed between the pixel electrode 27 and the light-shielding layer 53 and is in contact with these components. It is preferred that the second insulating layer 52 contain a silicon oxide such as silicon dioxide, or silicon oxynitride, and it is further preferred that the second insulating layer 52 be composed of the silicon oxide. The provision of the second insulating layer 52 inhibits the light-shielding layer 53 from making contact with the pixel electrode 27. This makes it possible to suppress an alternation in crystallinity of the pixel electrode 27 due to an influence of the light-shielding layer 53. In addition, the second insulating layer 52, by being composed of the silicon oxide, can be particularly easily manufactured.

The light-shielding layer 53 is disposed between the first insulating layer 51 and the second insulating layer 52 and is in contact with these layers. The light-shielding layer 53 has light-shielding properties. In this specification, the term "light-shielding properties" refers to light-shielding properties to visible light, and it is preferred that the term represent a transmittance of visible light being less than 50%, and it is further preferred that the term represent a transmittance of visible light being not greater than 10%. The spacer 5, which includes the light-shielding layer 53, is suppressed from functioning as a light-guiding path. This makes it possible to suppress light in one pixel P from entering into another pixel P to cause a reduction in contrast.

The light-shielding layer 53 is composed of a material containing a silicon nitride or a metal such as titanium nitride, for example. The light-shielding layer 53, by being composed of such a material, makes it possible to particularly effectively suppress the spacer 5 from functioning as the light-guiding path. In addition, the light-shielding layer 53, which contains the silicon nitride, makes it possible to form the spacer 5 without using a metal. This makes it possible to suppress a deterioration of the liquid crystal layer 9 due to an entry of the metal into the liquid crystal layer 9. This allows the electro-optical device 100 to have a long duration life.

The first insulating layer 51 illustrated in FIGS. 6 and 7 exemplifies "insulating layer". The first insulating layer 51 is sufficiently greater in thickness than each of the light-shielding layer 53 and the second insulating layer 52. It is preferred that the first insulating layer 51 contain a silicon oxide such as silicon dioxide, or silicon oxynitride, and it is further preferred that the first insulating layer 51 be composed of the silicon oxide. The first insulating layer 51 having high dimensional accuracy can be manufactured by dry etching or the like with ease with the containment of the silicon oxide and the silicon oxynitride. In particular, the first insulating layer 51, by being composed of the silicon oxide, can be more easily manufactured. In addition, the inclusion of the second insulating layer 52, the light-shielding layer 53, and the first insulating layer 51 that are described above makes it possible to form the spacer 5 constituted by an inorganic material to a particularly precise shape and a desired shape.

The coating layer 28 composed of an inorganic material containing a silicon is provided at a surface of the spacer 5. The coating layer 28 covers the surface of the spacer 5. Examples of the inorganic material containing the silicon include silicon oxide such as silicon dioxide. The spacer 5, by being covered by the coating layer 28, makes it possible to suppress, even when the light-shielding layer 53 contains a metal, a deterioration of the liquid crystal layer 9 due to the entry of the metal into the liquid crystal layer 9. This allows the electro-optical device 100 to have a long duration life.

In addition, the first alignment film 29 is provided on the coating layer 28. Thus, the coating layer 28 is provided both between the first alignment film 29 and the spacer 5 and between the first alignment film 29 and the pixel electrode 27. The provision of the coating layer 28 at a lower layer from the first alignment film 29 makes it possible to enhance a uniformity of the first alignment film 29, and to suppress the occurrence of locations at which the pixel electrode 27 is not covered by the first alignment film 29. Note that the coating layer 28 and the first alignment film 29 may not be provided at a tip end face of the spacer 5.

Note that the spacer 5 may include a layer other than the first insulating layer 51, the second insulating layer 52, and the light-shielding layer 53, and the second insulating layer 52 and the light-shielding layer 53 may be omitted, for example. In addition, the coating layer 28 may be omitted.

1E. Manufacturing Method for Spacer 5

FIGS. 8, 9, 10, and 11 are cross-sectional views for explaining a manufacturing method for the spacer 5.

Figure 8:
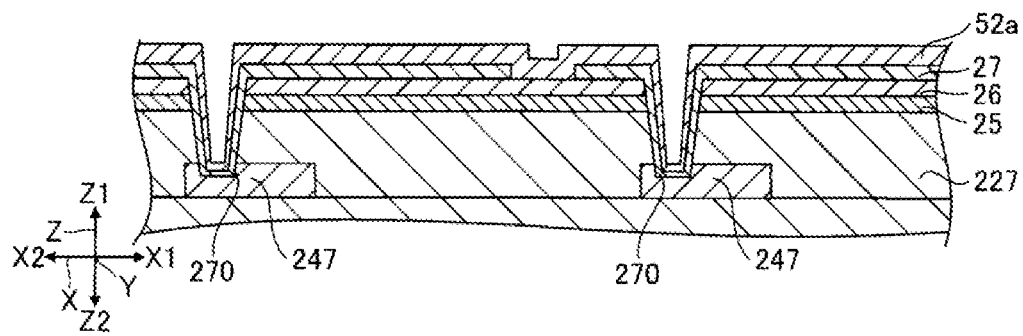
FIG. 8 is a cross-sectional view for explaining a manufacturing method for a spacer.

First, the metal oxide layer 26 containing an aluminum oxide or a hafnium oxide is formed on the protective layer 25, as illustrated in FIG. 8. The plurality of pixel electrodes 27 are then formed on the metal oxide layer 26. Specifically, a film composed of a transparent conductive material such as ITO is formed on the protective layer 25 by a physical vapor deposition (PVD) method or the like. Subsequently, the film is patterned to from the plurality of pixel electrodes 27. During such a patterning, the metal oxide layer 26 functions as an etch stopper. This allows the provision of the metal oxide layer 26 to suppress a damage by etching to the protective layer 25 and the interlayer insulating film 227. Note that the contact portion 270 of each of the pixel electrodes 27 is formed along a wall face of the contact hole.

Next, as illustrated in FIG. 8, a second insulating layer 52a is formed on the plurality of pixel electrodes 27 by a vapor deposition method, such as plasma CVD, for example. The second insulating layer 52a contains a silicon oxide or a silicon oxynitride, for example. The second insulating layer 52a is partially formed, in conformance with the shape of the contact portion 270, on the contact portion 270.

Figure 9:
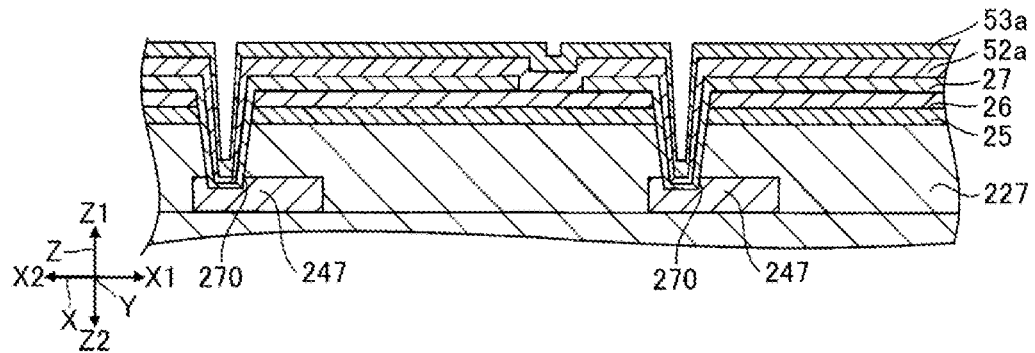
FIG. 9 is a cross-sectional view for explaining a manufacturing method for a spacer.

Next, as illustrated in FIG. 9, a light-shielding layer 53a is formed on the second insulating layer 52a by a sputtering method or vapor deposition method, for example. The light-shielding layer 53a is composed of a material containing a silicon nitride or a metal such as titanium nitride, for example. The light-shielding layer 53a is partially formed inside the contact hole, in conformance with the shape of the second insulating layer 52a, on the second insulating layer 52a.

Figure 10:
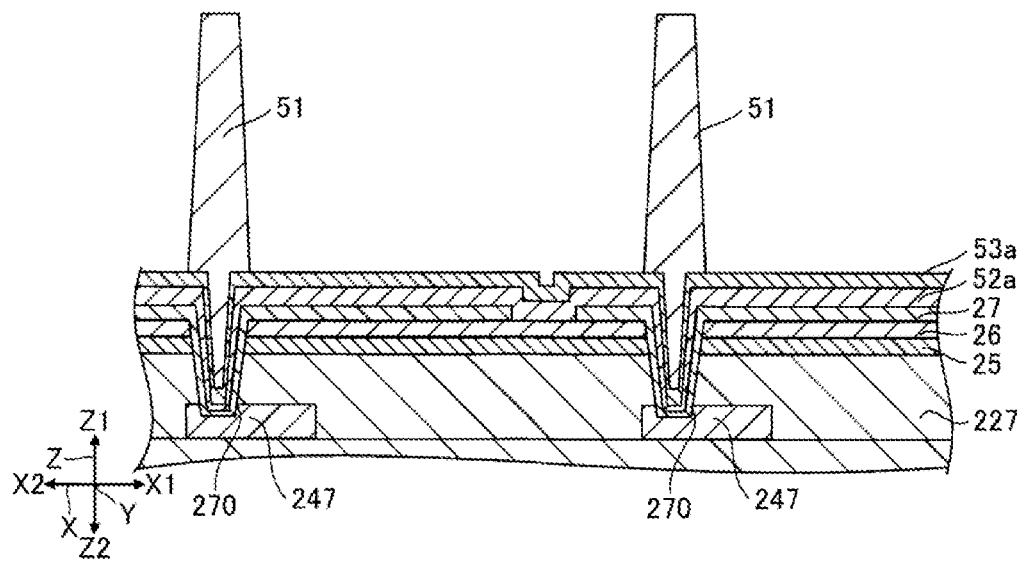
FIG. 10 is a cross-sectional view for explaining a manufacturing method for a spacer.

Next, as illustrated in FIG. 10, a plurality of the first insulating layers 51 are formed on the light-shielding layer 53a. Specifically, a silicon-containing layer containing a silicon oxide or a silicon oxynitride is formed on the light-shielding layer 53a by a vapor deposition method, such as plasma CVD, for example. Subsequently, the silicon-containing layer is patterned by dry etching or the like to form the plurality of the first insulating layers 51. Examples of an etching gas used in the dry etching include fluorocarbon gases such as methane tetrafluoride ($CF_4$) and cyclobutane octafluoride ($C_4F_8$), for example. The use of the dry etching enables the first insulating layer 51 to enhance the dimensional accuracy compared to a case when using a wet etching. In addition, the provision of the light-shielding layer 53a described above makes it possible to suppress a damage to the plurality of pixel electrodes 27 during the dry etching. Note that the first insulating layer 51 is provided to fill an inside of the contact hole.

Figure 11:
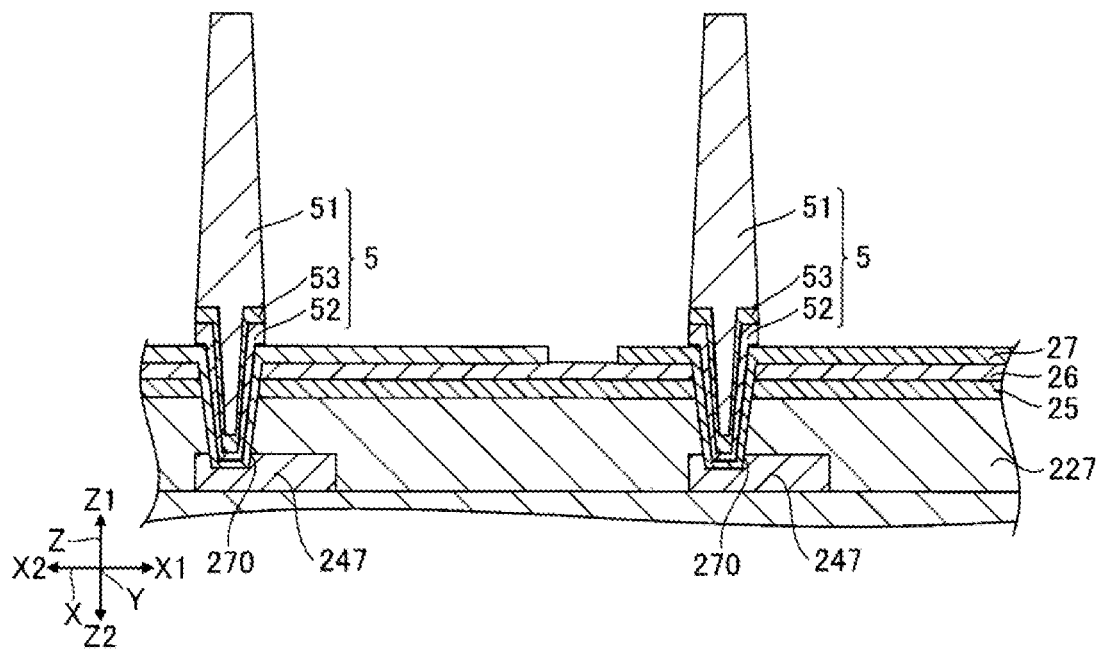
FIG. 11 is a cross-sectional view for explaining a manufacturing method for a spacer.

Next, parts of the light-shielding layer 53a are removed to form a plurality of the light-shielding layers 53, as illustrated in FIG. 11. In conducting the removal, a chemical dry etching is used, for example. The use of the chemical dry etching makes it possible to suppress a damage to the pixel electrode 27. For example, when the light-shielding layer 53a contains the titanium nitride, an etching gas containing a methane tetrafluoride ($CF_4$) and an oxygen ($O_2$) is used in the chemical dry etching.

Next, parts of the second insulating layer 52a are removed to from a plurality of the second insulating layers 52. In conducting the removal, a wet etching is used, for example. The use of the wet etching makes it possible to suppress a damage to the pixel electrode 27 compared to a case when using the dry etching. In conducting the wet etching, a fluorine-based etchant such as buffered hydrofluoric acid (BHF) or dilute hydrofluoric acid (DHF) is used, for example. The parts of the light-shielding layer 53a and the second insulating layer 52a are removed to form the plurality of spacers 5, as illustrated in FIG. 11.

The use of the methods as above makes it possible to manufacture the spacer 5 composed of an inorganic material in a particularly easy and reliable manner. The use also makes it possible, during a manufacture of the spacer 5, to particularly effectively suppress a damage to the pixel electrode 27.

Figure 12:
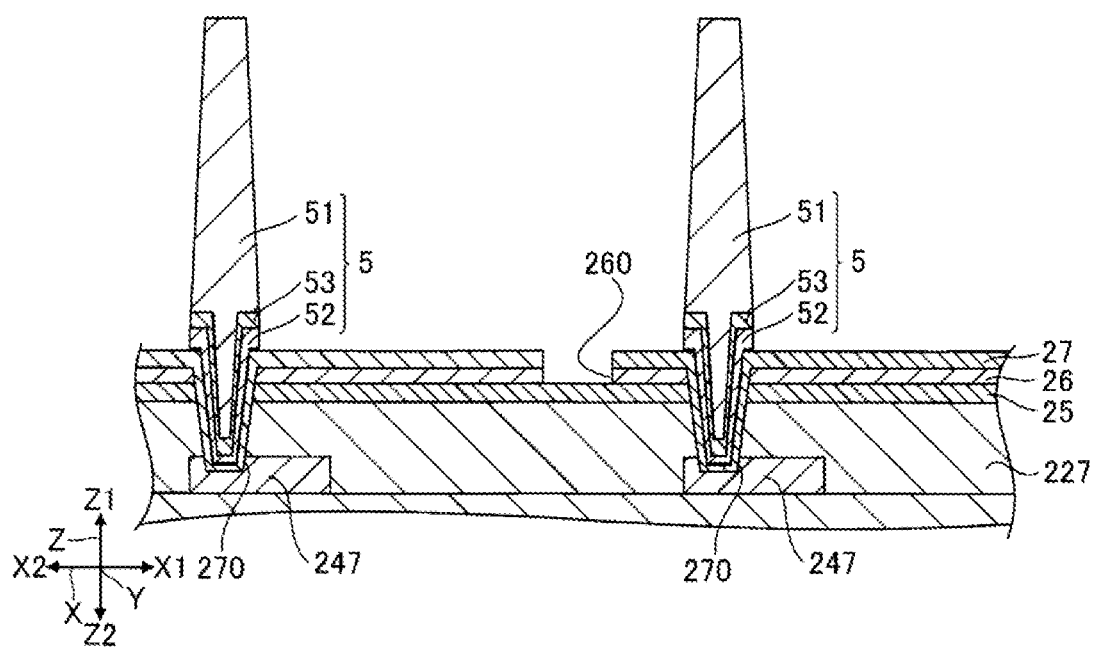
FIG. 12 is a cross-sectional view for explaining a manufacturing method for a metal oxide layer.

FIG. 12 is a cross-sectional view for explaining a manufacturing method for the metal oxide layer 26. As illustrated in FIG. 12, the spacer 5 is formed, then the metal oxide layer 26 is partially removed to form the opening portion 260. The formation of the opening portion 260 causes a part of the protective layer 25 to be exposed. That is, the part of the protective layer 25 avoids overlapping both the pixel electrode 27 and the metal oxide layer 26 when viewed in the Z1 direction. The protective layer 25, which includes a portion that is not covered by the metal oxide layer 26, effectively absorbs moisture entrained in the liquid crystal layer 9. Further, when the metal oxide layer 26 contains an aluminum oxide, the metal oxide layer 26 is partially removed using a hydrofluoric acid or the like. Accordingly, the metal oxide layer 26, which contains the aluminum oxide, makes it possible to easily remove the part of the metal oxide layer 26.

In addition, although not illustrated in the drawings, after causing the part of the protective layer 25 to be exposed, the coating layer 28 is formed in a manner covering the spacer 5. The coating layer 28 is formed by an Atomic Layer Deposition (ALD) method, for example. In the formation of the coating layer 28, a surface of the pixel electrode 27 is obliquely disposed with respect to a vapor deposition source, as appropriate. This allows the coating layer 28 to be suitably formed at a wall face of the spacer 5, as well as at the surface of the pixel electrode 27. The coating layer 28 is formed of an inorganic material containing a silicon, for example. In particular, the coating layer 28, by being formed of a silicon oxide such as silicon dioxide, can be formed to be homogeneous and sufficiently thin by an ALD method.

Further, although not illustrated in the drawings, after forming the coating layer 28, a film containing a silicon oxide and the like is formed on the coating layer 28 by a CVD or ALD method, for example. Then, the film is subjected to a rubbing treatment to form the first alignment film 29. The formation of the first alignment film 29 on the coating layer 28 makes it possible to enhance adhesion properties of the first alignment film 29 to both the pixel electrode 27 and the spacer 5, compared to a case where the coating layer 28 is not formed. In order to enhance the adhesion properties, it is particularly preferred that the coating layer 28 contain the same material as the first alignment film 29. Note that, in the formation of the first alignment film 29 as well, the surface of the pixel electrode 27 is obliquely disposed with respect to the vapor deposition source as appropriate, as in the formation of the coating layer 28.

2. Modified Example

The embodiment exemplified above can be variously modified. Specific modified aspects applicable to the embodiment described above are exemplified below. Two or more aspects arbitrarily selected from exemplifications below can be appropriately used in combination as long as mutual contradiction does not arise.

In the above-described embodiment, a part of the spacer 5 overlaps the part of the pixel electrode 27 when viewed in the Z1 direction, and the entirety of the spacer 5 may overlap the pixel electrode 27 when viewed in the Z1 direction. However, as in the above-described embodiment, it suffices that at least a part of the spacer 5 overlap the pixel electrode 27 when viewed in the Z1 direction.

In the above-described embodiment, the one piece of the spacer 5 overlaps the two pieces of the pixel electrodes 27 when viewed in the Z1 direction, and the one piece of the spacer 5 may overlap only the one piece of the pixel electrode 27. The one piece of the spacer 5 may also overlap three pieces of the pixel electrodes 27 or four pieces of the pixel electrodes 27. The spacer 5 may also be formed in a linear shape extending across three or more pieces of the pixel electrodes 27 aligned along the X axis or the Y axis, when viewed in the Z1 direction. That is, the spacer 5 may be formed in a wall shape provided across three or more pieces of the pixel electrodes 27 aligned along the X axis or the Y axis.

In the above-described embodiment, the first alignment film 29 is formed in a manner covering the spacer 5, and the first alignment film 29 may be provided at the surface of the pixel electrode 27 and may not be provided at the surface of the spacer 5. In that case, the first alignment film 29 may be formed on the pixel electrode 27 after the formation of the pixel electrode 27 and before the formation of the spacer 5.

In the above-described embodiment, the one piece of the spacer 5 is provided corresponding to the plurality of pixel electrodes 27, and the spacer 5 and the pixel electrode 27 may be provided in a one-to-one manner.

In the above-described embodiment, the cases where the transistor 23 serves as a TFT are described as examples, and the transistor 23 may also be, for example, a metal-oxide-semiconductor field-effect transistor (MOSFET) or the like, without being limited to the TFT.

In the above-described embodiment, the electro-optical device 100 of an active matrix driving scheme is exemplified, and the driving scheme of the electro-optical device may be, for example, a passive matrix driving scheme or the like, without being limited to the active matrix driving scheme.

3. Electronic Apparatus

The electro-optical device 100 can be used for various types of electronic apparatuses.

Figure 13:
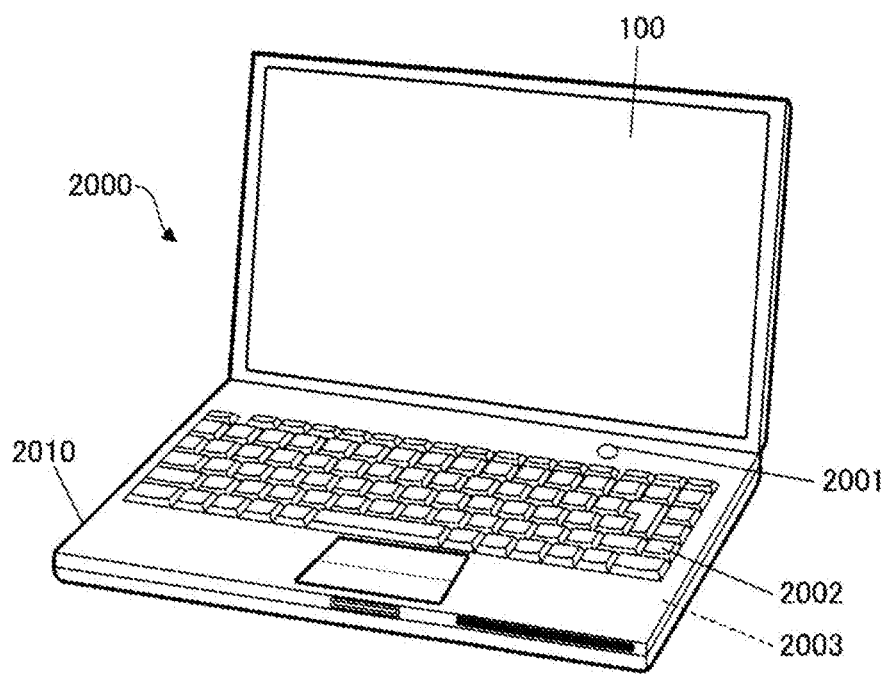
FIG. 13 is a perspective view illustrating a personal computer as an example of an electronic apparatus.

FIG. 13 is a perspective view illustrating a personal computer 2000 as an example of the electronic apparatus. The personal computer 2000 includes the electro-optical device 100 configured to display various types of images, a main body portion 2010 in which a power source switch 2001 and a keyboard 2002 are installed, and a control unit 2003. The control unit 2003 includes a processor and a memory, for example, and controls an operation of the electro-optical device 100.

Figure 14:
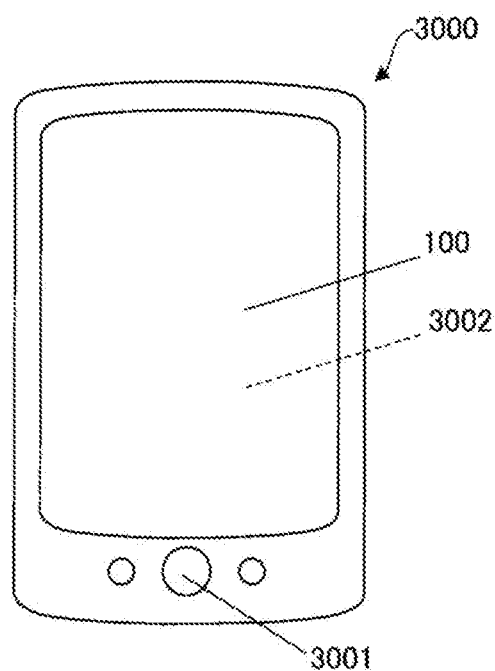
FIG. 14 is a plan view illustrating a smart phone as an example of an electronic apparatus.

FIG. 14 is a plan view illustrating a smartphone 3000 as an example of the electronic apparatus. The smartphone 3000 includes an operation button 3001, the electro-optical device 100 configured to display various types of images, and a control unit 3002. A screen content displayed on the electro-optical device 100 is changed in accordance with an operation of the operation button 3001. The control unit 3002 includes a processor and a memory, for example, and controls the operation of the electro-optical device 100.

Figure 15:
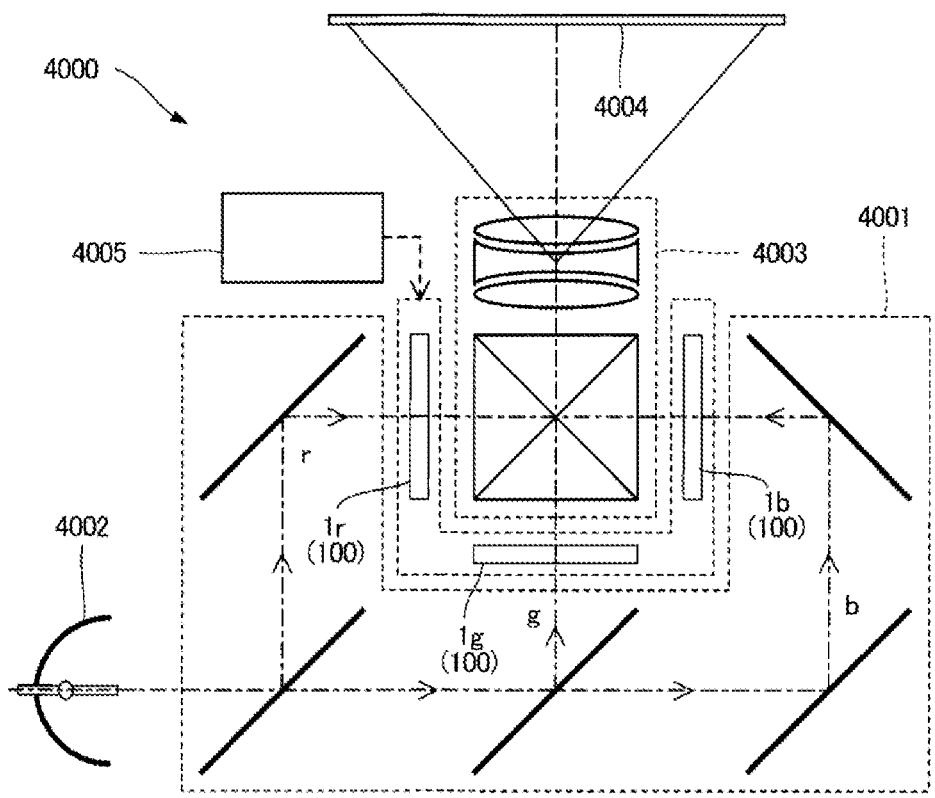
FIG. 15 is a diagram schematically illustrating a configuration of a projector as an example of an electronic apparatus.

FIG. 15 is a diagram schematically illustrating a configuration of a projector as an example of the electronic apparatus. A projection-type display apparatus 4000 serves as a three-plate type projector, for example. An electro-optical device 1r serves as the electro-optical device 100 corresponding to a red display color, an electro-optical device 1g serves as the electro-optical device 100 corresponding to a green display color, and an electro-optical device 1b serves as the electro-optical device 100 corresponding to a blue display color. That is, the projection-type display apparatus 4000 includes three pieces of the electro-optical devices 1r, 1g, and 1b that correspond to red, green, and blue display colors, respectively. A control unit 4005 includes a processor and a memory, for example, and controls the operation of the electro-optical device 100.

An illumination optical system 4001 is configured to supply a red constituent r of light emitted from an illumination device 4002 serving as a light source to the electro-optical device 1r, a green constituent g of the light to the electro-optical device 1g, and a blue constituent b of the light to the electro-optical device 1b. Each of the electro-optical devices 1r, 1g, and 1b functions as an optical modulator, such as a light valve, which is configured to modulate respective beams of monochromatic light supplied from the illumination optical system 4001 in accordance with the images that are displayed. A projection optical system 4003 synthesizes the beams of the light emitted from the electro-optical devices 1r, 1g, and 1b to project the synthesized light to a projection surface 4004.

The above electronic apparatuses include the electro-optical device 100 described above and the control unit 2003, 3002, or 4005. The electro-optical device 100 achieves high resolution as described above. This makes it possible to enhance a display quality of the personal computer 2000, the smartphone 3000, or the projection-type display apparatus 4000.

Note that examples of the electronic apparatus to which the electro-optical device of the present disclosure is applied include Personal Digital Assistants (PDA), digital still cameras, televisions, video cameras, car navigation devices, display apparatuses for in-vehicle use, electronic organizers, electronic papers, electronic calculators, word processors, workstations, visual telephones, Point of Scale (POS) terminals, without being limited to the apparatuses described above. Examples of the apparatus to which the present disclosure is applied further include an apparatus provided with a printer, a scanner, a copier, a video player, or a touch panel.

The present disclosure have been described as above based on the preferred embodiments, however, the present disclosure is not limited to the above-described embodiments. Further, the configurations of the respective components of the present disclosure may be replaced with any configuration that exerts functions equivalent to those of the above-described embodiments, and to which any configuration may be added.

In addition, in the description given above, the liquid crystal device is described as an example of the electro-optical device of the present disclosure, however, the electro-optical device of the present disclosure is not limited to the liquid crystal device. For example, the electro-optical device of the present disclosure can also be applied to an image sensor or the like. For example, the present disclosure is also applicable to a display panel using a light-emitting device such as organic electroluminescent (EL) device, inorganic EL device, or light-emitting polymer, as in the embodiments described above. Further, the present disclosure is also applicable to an electrophoretic display panel using micro capsules each including colored liquid and white particles dispersed in the liquid, as in the embodiments described above.

What is claimed is:
1. An electro-optical device, comprising:
   a first substrate including a first pixel electrode and a second pixel electrode;
   a second substrate including a common electrode; and an electro-optical layer disposed between the first pixel electrode and the second pixel electrode, and the common electrode, the electro-optical layer having optical characteristics varying in accordance with an electric field, wherein the first substrate is provided with a spacer containing an inorganic material having translucency and insulating properties, the spacer defining a distance between the first substrate and the second substrate, the spacer includes a first insulating layer, a light-shielding layer having light-shielding properties, and a second insulating layer, the first insulating layer contains a silicon oxide or a silicon oxynitride, the light-shielding layer is composed of a material containing a silicon nitride or a metal, the second insulating layer contains a silicon oxide or a silicon oxynitride, the light-shielding layer is disposed between the first insulating layer and the second insulating layer, the first insulating layer is in physical contact with and completely covers a top surface of the light-shielding layer, a sidewall of the first insulating layer, at least a portion of a sidewall of the light-shielding layer, and at least a portion of a sidewall of the second insulating layer are aligned, and both of the first pixel electrode and the second pixel electrode are overlapped with the same spacer when viewed in a thickness direction of the first substrate.

2. The electro-optical device according to claim 1, wherein
a coating layer composed of an inorganic material containing a silicon is provided at a surface of the spacer.

3. The electro-optical device according to claim 1, wherein
the first substrate includes
an insulating body provided with a conductive film coupled to the first pixel electrode, and
a metal oxide layer disposed between the insulating body and the first pixel electrode, the metal oxide layer containing an aluminum oxide or a hafnium oxide.

4. An electronic apparatus comprising:
the electro-optical device according to claim 1; and
a control unit configured to control an operation of the electro-optical device.

5. The electro-optical device according to claim 1, wherein
an overlapping area between the first pixel electrode and the spacer when viewed in the thickness direction of the first substrate is equal to an overlapping area between the second pixel electrode and the same spacer when viewed in the thickness direction of the first substrate.

* * * * *